United States Patent Office 3,093,679
Patented June 11, 1963

3,093,679
ESTERVINYLATION OF AROMATIC AMINES
Lee A. Miller, Dayton, Ohio, assignor to Monsanto Chemical Company, St. Louis, Mo., a corporation of Delaware
No Drawing. Filed July 31, 1961, Ser. No. 127,886
10 Claims. (Cl. 260—471)

The present invention relates to the production of aromatic amine derivatives and more particularly relates to the production of N-(carboalkoxyvinyl) derivatives of aromatic amines from alkyl propiolates and certain aromatic amines.

The reaction of aromatic amines with alkyl propiolates to give N-(carboalkoxyvinyl) aromatic amine derivatives is generally referred to as estervinylation. It is an example of a Michael type condensation in which the alkyl propiolate serves as the acceptor molecule. Estervinylation of active hydrogen compounds (alcohols, phenols, mercaptans, etc.) generally proceeds readily and in high yield with basic catalysts, and aliphatic primary and secondary amines react smoothly with alkyl propiolates in the presence or absence of a basic catalyst to give amino acrylates in very good yields. Aromatic amines are vastly inferior in reactivity toward alkyl propiolates, so that reaction, if any, occurs to give only very low yields, i.e., in the order of up to 20%, of the desired arylamino acrylates. Accordingly, it is the object of this invention to provide an improved process for preparing alkylarylaminoacrylates from an aromatic amine and an alkyl propiolate in higher yield than was previously obtainable.

This object is accomplished, according to this invention by reacting the aromatic amine with the alkyl propiolate in the presence of a catalyst selected from the group consisting of alkanoic acids having from 1 to 18 carbon atoms and acidic salts of said acids, with a metal of groups I and II of the periodic arrangement of elements. An optional variation of the catalyst is to use the alkanoic acid in combination with an inorganic acidic salt of one of said elements, e.g., copper chloride or mercury sulfate. Another variation is to use the group I and II metal salt of the alkanoic acid in its hydrated form; for example, cupric acetate monohydrate may be used.

Examples of the presently useful alkanoic acids and metal salts thereof are acetic, propionic, butyric, valeric, octanoic, decanoic, lauric, myristic, palmitic and stearic acid, copper propionate, silver valerate, magnesium acetate, zinc palmitate, cadmium laurate, barium myristate, gold stearate, beryllium butyrate, etc. Inorganic acidic salts of present utility which can be employed in combination with the alkanoic acids are, e.g., cupric or cuprous chloride or nitrate, zinc sulfate, silver phosphate, magnesium or calcium bicarbonate, lithium, sodium or potassium bisulfate, etc.

The catalyst concentration in the reaction mixture may vary broadly depending upon the nature of the aromatic amine reactant and the rate of reaction desired. Generally, the catalyst concentration may vary from 0.01 to 5.0 mole percent based upon the moles of the aromatic amine. With the more reactive aromatic amine reactants, concentrations of from 0.25 to 0.5 mole percent is generally useful.

While the actual role of the present alkanoic acid catalyst in the reaction or propiolates with aromatic amines has not conclusively been demonstrated, it is probably associated with the well-known propensity of alkanoate ions to form complexes, since both the active hydrogen of the aromatic amine and the triple bond radical of the propiolate are capable of forming complexes with these ions. The very good efficiency of these catalysts in contradistinction to prior, non-acidic compounds is probably due mainly to their ability to form relatively short-lived complexes of the proper degree of reactivity whereby the catalyst is not permanently removed from the reaction zone as a fixed, possibly insoluble, compound or complex.

The presently useful propiolates are compounds of the formula $HC{\equiv}CCOOR$ wherein R is a lower alkyl group, i.e., one having from 1 to 6 carbon atoms. Examples of presently suitable propiolates are as follows: methyl propiolate, ethyl propiolate, isopropyl propiolate, n-butyl propiolate, isobutyl propiolate, tertiary-butyl propiolate, n-amyl propiolate, n-hexyl propiolate, etc.

Aromatic amines which are useful according to the process presently are generally aromatic primary and secondary monoamines and diamines of from 6 to 18 carbon atoms, e.g., aniline, N-monoalkyl derivatives thereof, that is, secondary amines such as N-methyl-, N-ethyl-, N-propyl-, N-hexyl-, N-octyl-, and N-2-ethylhexyl aniline but preferably those having from 1 to 3 carbon atoms in the N-alkyl radical of the secondary amine compound. Nuclearly substituted anilines and N-alkyl-anilines such as 3- and 4-toluidine, 2-ethylaniline, 4-amylaniline, 3-dodecylaniline, 2-, 3- or 4-chloro-, fluoro-, iodo- or 2-, 3- or 4-nitroaniline, 4-anisidine, 2-, 3- or 4-phenetidine; α- or β-naphthylamine, or its N-alkyl and/or nuclearly substituted derivatives; diamines such as benzidine, methylenedianiline, 2-, 3- and 4-p-phenylenediamine, etc.

According to the invention, the reaction between the amine and the propiolate to give the olefinic addition products is effected by simply mixing the aromatic amine compound with the alkyl propiolate in the presence of the alkanoic acid or salt thereof or mixture of alkanoic acid and acidic inorganic salt, and allowing the resulting reaction mixture to stand at a temperature of from say, ordinary room temperature to the refluxing temperature of the reaction mixture until formation of the (arylamino) acrylate has taken place. Depending upon the nature of the individual aromatic amine and of the alkanoic acid and/or salt catalyst used, the addition reaction may occur under varying conditions of temperature and pressure. For optimum yields, however, it is advantageous to heat the reaction mixture at a temperature of say from approximately 50° C. to refluxing temperatures. The reaction may be effected at ordinary, sub-atmospheric or super-atmospheric pressure and in the presence or absence of an inert diluent or solvent, e.g., benzene, hexane, dioxane, hexachloroethane, etc. The solvent may also comprise an excess of reactant or catalyst. The alkanoic acid content in the reaction may range from catalytic amounts, say, from 0.01% to 5.0% to larger quantities ranging up to 50% to 100% or more of the weight of the reactants when it is desired to have the alkanoic acid serve also as a diluent or solvent in the reaction medium. Thus, e.g., when a copper alkanoate is the desired catalyst, it is merely necessary to add an equivalent amount of a soluble copper salt, e.g., copper chloride to the reaction medium to promote the desired addition reaction. Quantities of soluble copper salts on the order of from 0.1% to 5% by weight are generally sufficient to effect the desired catalysis. Inasmuch as molecular equivalent of the aromatic amine compound and the alkyl propiolate are involved in the formation of the (arylamino) acrylates, it is advantageous to employ stoichiometric proportions of the two reactants. If desired, however, an excess of either reactants may be employed since unconsumed material is readily separated from the product. For example, the unreacted alkyl propiolate is easily evaporated off and the unreacted aromatic amine is also readily separated from the reaction mixture.

Alkyl 3-(arylamino) acrylates produced according to the process of this invention may be advantageously employed for a variety of industrial and agricultural purposes, for example, as hardening agents in synthetic rubber manufacturing processes, as plasticizers for vinyl polymers; as mold release agents in the plastic industries; and as active ingredients in biological toxicant compositions in preventing or inhibiting the growth of fungi or bacteria.

The invention is further illustrated by, but not limited to, the following examples:

Example 1

This example illustrates use of an alkanoic acid as catalyst for reaction of an aromatic amine and an alkyl propiolate.

To a mixture of 10.7 g. (0.1 mole) of N-methylaniline, 100 ml. of benzene, and 1 ml. of glacial acetic acid, there was added 8.4 g. (0.1 mole) of methyl propiolate. The reaction mixture was heated to reflux and then heated at that temperature for 12 hours. The resulting reaction mixture was washed with 50 ml. of saturated aqueous ammonium chloride solution and 50 ml. of distilled water and the organic solvent was removed under vacuum pressure. Distillation of the residue yielded 16.4 (86% theoretical yield) of methyl 3-(N-methyl-N-phenylamino) acrylate, $n_D^{25}$ 1.6059. The compound analyzed 69.30% carbon and 7.14% hydrogen. Theoretical values are 69.09% carbon and 6.85% hydrogen.

Exmple 2

This example illustrates an attempt to conduct the reaction between an aromatic amine and an alkyl propiolate in the presence of either a basic catalyst or of no catalyst.

A solution of 8.4 g. (0.1 mole) of methyl propiolate in 50 ml. of benzene was added dropwise to a solution of 10.7 g. (0.1 mole) of N-methylaniline, 100 ml. of benzene, and 1 ml. of a 40% methanolic solution of trimethylbenzyl ammonium methoxide as catalyst. No exothermic reaction occurred, but the reaction mixture darkened when heated at reflux for 12 hours. After removing the benzene solvent under vacuum pressure the residue was distilled to obtain 2.8 g. (15% theoretical yield) of methyl 3-(N-methyl-N-phenylamino) acrylate B.P. 130–133° C. at 0.5 mm., $n_D^{25}$ 1.6026.

Using no catalyst, the following experiment was conducted:

To a reaction vessel there was charged a mixture of 8.4 g. (0.1 mole) of methyl propiolate, 10.7 g. (0.1 mole) of N-methylaniline and 100 ml. of benzene, which mixture was gradually heated to reflux and then heated at that temperature for 12 hours. No exothermic reaction was observed in mixing the reactants. The benzene solvent was then removed under vacuum pressure and the residue was distilled to obtain 3.4 g. (18% theoretical yield) of methyl 3-(N-methyl-N-phenylamino) acrylate, B.P. 131–132° C., at 0.025 mm., $n_D^{25}$ 1.6058.

Example 3

To a mixture of 10.7 g. (0.1 mole) of N-methylaniline, 100 ml. of dioxane and 0.5 g. of cupric acetate, there was added cautiously 8.4 g. (0.1 mole) of methyl propiolate. The reaction mixture was heated at reflux for 6 hours and then the dioxane solvent was evaporated under vacuum pressure to leave 50 ml. of residue which was poured into 150 ml. of water. The thus-obtained aqueous residue was extracted with three 100-ml. portions of ethyl ether. The ether layer was washed with three 50-ml. portions of 5% aqueous sodium hydroxide followed by two 100-ml. portions of water. The resulting ether layer was filtered to remove traces of solid and combined with 100 ml. of benzene and evaporated under vacuum pressure. The dark brown oil residue was distilled under vacuum to obtain 13.9 g. (73% theoretical yield) of methyl 3-(N-methyl-N-phenylamino) acrylate, B.P. 116–119° C./0.3 mm., $n_D^{25}$ 1.6059.

Example 4

This example illustrates the process of the invention using a diamine.

A mixture of 10.8 g. (0.1 mole) of p-phenylenediamine, 17.6 g. (0.2 mole+5% excess) of methyl propiolate, 100 ml. of benzene, and 2 ml. of acetic acid was stirred at reflux for 12 hours. When the refluxing was completed, the reaction mixture was filtered to obtain 9 g. of crude product which was washed with two 100-ml. portions of ether and dried for 1.5 hours. The product thus obtained, M.P. 107–110° C. analyzed 61.02% carbon and 6.44% hydrogen as compared to 60.86% and 5.84%, the respective calculated values. Infrared analysis of the product gave the following results:

| Absorption | Function Indicated |
| --- | --- |
| 3220 cm.$^{-1}$ | NH. |
| 1675 cm.$^{-1}$ | C=O. |
| 1600–1500 cm.$^{-1}$ | C=C aromatic. |
| 1260–1135 cm.$^{-1}$ | C—N and/or C—O ester. | which data is consistent with the compound N,N'-bis(2-carbomethoxyvinyl)-p-phenylenediamine.

Example 5

This example shows the use of copper stearate as catalyst.

A mixture consisting of 9.2 g. (0.11 mole) of methyl propiolate, 12.1 g. (0.1 mole) of N-ethylaniline, 100 ml. of benzene and 1 g. of cupric stearate was stirred at reflux for 7 hours. After being allowed to cool to room temperature, the reaction mixture was filtered and the filtrate was washed with two 100-ml. portions of water. The washed filtrate was then evaporated to give 11.7 g. (57% theoretical yield) of the substantially pure methyl 3-(N-ethyl-N-phenylamino) acrylate, $n_D^{25}$ 1.5890.

Example 6

A mixture consisting of 9.2 g. (0.11 mole) of methyl propiolate, 12.1 g. (0.1 mole) of N-ethylaniline, 100 ml. of benzene and 0.5 g. of mercuric acetate was stirred at reflux for 7 hours. The reaction mixture was then allowed to attain room temperature, washed with two 100-ml. portions of water, and evaporated. The residual orange oil was distilled via a Vigreux column to give 11.0 g. (54% theoretical yield) of the substantially pure methyl 3-(N-ethyl-N-phenylamino) acrylate, B.P. 107–109° C./0.5 mm., $n_D^{25}$ 1.5912, and analyzing 70.41% carbon and 7.41% hydrogen as against 70.22% and 7.37%, the respective calculated values.

What I claim is:

1. A method which comprises reacting an amine selected from the class consisting of aromatic hydrocarbon and aromatic-paraffinic hydrocarbon primary and secondary mono- and diamines of from 6 to 18 carbon atoms with alkyl propiolate having from 1 to 6 carbon atoms in the alkyl in the presence of a catalyst selected from the group consisting of alkanoic acids having from 1 to 12 carbon atoms, salts of said acids with group I–II metals, and mixtures of said acids with acidic inorganic salts of said metals at a temperature of from 50° C. to refluxing, to form an N-carboalkoxyvinyl aromatic amine.

2. The method according to claim 1 wherein the amine is N-alkylaniline.

3. The method of claim 1 wherein the aromatic amine is N-alkylaniline and the alkyl propiolate is methyl propiolate.

4. The method of claim 1 where said catalyst is alkanoic acid having from 1 to 18 carbon atoms.

5. The method of claim 1 wherein said catalyst is a copper salt of alkanoic acid having from 1 to 18 carbon atoms.

6. The method of claim 1 wherein said group I metal is copper.

7. The method according to claim 1 wherein the amine is a diamine.

8. The method which comprises refluxing N-methylaniline with methyl propiolate in the presence of acetic acid as catalyst and an inert liquid diluent, and recovering methyl 3-(N-methyl-N-phenylamino) acrylate from the resulting reaction product.

9. A method which comprises refluxing N-methylaniline with methyl propiolate in the presence of copper acetate as catalyst and an inert liquid diluent, and recovering methyl 3-(N-methyl-N-phenylamino) acrylate from the resulting reaction product.

10. A method which comprises refluxing p-phenylenediamine with methyl propiolate in the presence of acetic acid as catalyst and an inert liquid diluent, and recovering N,N'-bis(carbomethoxyvinyl) - p - phenylenediamine from the resulting reaction product.

References Cited in the file of this patent

Owen et al.: J. Chem. Soc., 1949 (3109–13).
Johnson: Acetylenic Compounds, II, London, 1950, pages 119–120.
Gray et al.: J. Am. Chem. Soc., 73, 3577–8 (1951).
Raphael: Acetylenic Compounds in Organic Synthesis (New York, 1955), pages 39–40.

UNITED STATES PATENT OFFICE
CERTIFICATE OF CORRECTION

Patent No. 3,093,679  June 11, 1963

Lee A. Miller

It is hereby certified that error appears in the above numbered patent requiring correction and that the said Letters Patent should read as corrected below.

Column 4, line 64, for "12" read -- 18 --.

Signed and sealed this 11th day of February 1964.

(SEAL)
Attest:
ERNEST W. SWIDER

Attesting Officer

EDWIN L. REYNOLDS

Acting Commissioner of Patents